United States Patent [19]

Byers

[11] Patent Number: 4,748,149

[45] Date of Patent: May 31, 1988

[54] THERMAL PRINT ELEMENT COMPRISING A YELLOW MEROCYANINE DYE STABILIZED WITH A CYAN INDOANILINE DYE

[75] Inventor: Gary W. Byers, Webster, N.Y.

[73] Assignee: Eastman Kodak Company, Rochester, N.Y.

[21] Appl. No.: 77,364

[22] Filed: Jul. 24, 1987

Related U.S. Application Data

[63] Continuation-in-part of Ser. No. 14,565, Feb. 13, 1987, Pat. No. 4,695,632.

[51] Int. Cl.$^4$ .............................................. B41M 5/26
[52] U.S. Cl. ............................................ 503/227; 8/471;
428/195; 428/207; 428/412; 428/480; 428/913; 428/914; 430/945
[58] Field of Search ................... 8/470, 471; 503/227; 427/146, 256; 428/195, 207, 411.1, 412, 480, 484, 488.1, 488.4, 913, 914

[56] References Cited

U.S. PATENT DOCUMENTS 3,933,914 1/1976 Coles et al. ............................. 8/471
4,632,895 12/1986 Patel et al. ........................... 430/201

FOREIGN PATENT DOCUMENTS 0147747 7/1985 European Pat. Off. ............ 428/195
2521988 12/1975 Fed. Rep. of Germany .......... 8/471
0210888 12/1982 Japan ...................................... 8/470
60/214994 10/1985 Japan ...................................... 8/471
60-239289 11/1985 Japan ...................................... 8/471

*Primary Examiner*—Bruce H. Hess
*Attorney, Agent, or Firm*—Harold E. Cole

[57] ABSTRACT

A thermal print element comprising a support having thereon a layer containing a thermally-transferred dye image, the dye image comprising a yellow merocyanine dye having the formula:

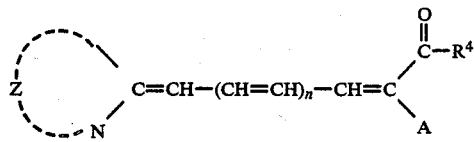

wherein:
A represents —COR, —COOR, —CONHR, —CN, —SO$_2$R or —SO$_2$NR$_2$; or A may be combined together with
R$^4$ to form a heterocyclic or carbocyclic ring system;
R$^4$ represents —NHR, —NR$_2$, —OR, —SR, or —R;
n represents 0 to 1;
Z represents the atoms necessary to complete a 5- or 6-membered substituted or unsubstituted heterocyclic ring; and
each R independently represents a substituted or unsubstituted alkyl or aryl group;
the dye image also comprising a cyan indoaniline dye in the same areas as the yellow merocyanine dye to provide improved stability to light for the yellow merocyanine dye, the cyan indoaniline dye having the formula:

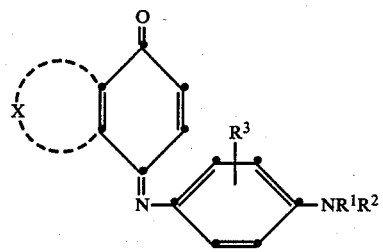

wherein:
R$^1$ and R$^2$ are each independently hydrogen or a substituted or unsubstituted alkyl, cycloalkyl, or aryl group;
R$^3$ is hydrogen, a substituted or unsubstituted alkyl group, halogen, —NHCOR$^1$ or —NHSO$_2$R$^1$; and
X represents hydrogen or the atoms necessary to complete a 5- or 6-membered, substituted or unsubstituted, carbocyclic or heterocyclic ring system.

12 Claims, No Drawings

THERMAL PRINT ELEMENT COMPRISING A YELLOW MEROCYANINE DYE STABILIZED WITH A CYAN INDOANILINE DYE

This is a continuation-in-part of application Ser. No. 014,565, filed Feb. 13, 1987 now U.S. Pat. No. 4,695,632, filed Sept. 22, 1987.

This invention relates to a thermal print element comprising a yellow merocyanine dye image having a cyan indoaniline dye in the same areas to provide improved stability to light for the yellow merocyanine dye.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Stability to light for a thermally transferred dye is important in both an absolute and relative sense. In a monochrome system, where a neutral is formed by a combination of two or more dyes, it is important that each of the dyes fade at approximately the same rate. If they do not, then the neutral image will change hue.

U.S. patent application Ser. No. 059,442 of Byers et al. entitled "Merocyanine Dye-Donor Element Used in Thermal Dye Transfer", filed June 8, 1987, describes merocyanine yellow dyes which provide good transfer densities for a thermal print at reasonable coating levels. There is a problem with some of these dyes in that their stability to light is not good as one would like.

It would be desirable to provide a way to stabilize merocyanine dyes used to obtain thermal prints against fading by light.

These and other objects are achieved in accordance with the invention which comprises a support having thereon a layer containing a thermally-transferred dye image, the dye image comprising a yellow merocyanine dye having the formula:

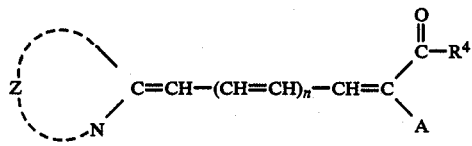

wherein:

A represents —COR, —COOR, —CONHR, —CN, —SO$_2$R or —SO$_2$NR$_2$; or A may be combined together with
R$^4$ to form a heterocyclic or carbocyclic ring system such as

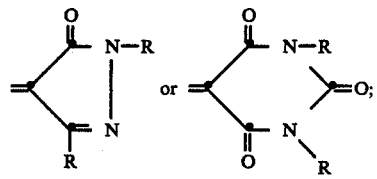

R$^4$ represents —NHR, —NR$_2$, —OR, —SR, or —R;
n represents 0 or 1;
Z represents the atoms necessary to complete a 5- or 6-membered substituted or unsubstituted heterocyclic ring such as 3H-indole, benzoxazole, thiazoline, benzimidazole, oxazole, thiazole; and each R independently represents a substituted or unsubstituted alkyl group of from 1 to about 6 carbon atoms such as methyl, ethyl, propyl, isopropyl, butyl, pentyl, hexyl or such alkyl groups substituted with hydroxy, acyloxy, alkoxy, aryl, cyano, acylamido, halogen, etc.; or a substituted or unsubstituted aryl group of from about 6 to about 10 carbon atoms such as phenyl, p-tolyl, m-chlorophenyl, p-methoxyphenyl, m-bromophenyl, o-tolyl, etc;

the dye image also comprising a cyan indoaniline dye in the same areas as the yellow merocyanine dye to provide improved stability to light for the yellow merocyanine dye, the cyan indoaniline dye having the formula:

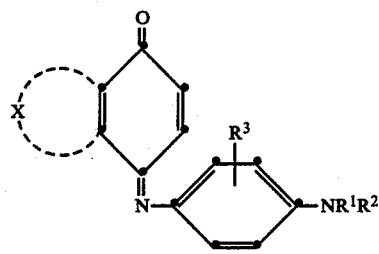

wherein:
R$^1$ and R$^2$ are each independently hydrogen, a substituted or unsubstituted alkyl group of from 1 to about 6 carbon atoms such as methyl, ethyl, propyl, isopropyl, butyl, pentyl, hexyl, methoxyethyl, benzyl, 2-methanesulfonamidoethyl, 2-hydroxyethyl, 2-cyanoethyl, methoxycarbonylmethyl, etc.; a substituted or unsubstituted cycloalkyl group of from 5 to about 7 carbon atoms such as cyclohexyl, cyclopentyl, etc; or a substituted or unsubstituted aryl group of from about 5 to about 10 carbon atoms such as phenyl, pyridyl, naphthyl, p-tolyl, p-chlorophenyl, m-(N-methyl sulfamoyl)phenyl, etc.;
R$^3$ is hydrogen; a substituted or unsubstituted alkyl group of from 1 to about 6 carbon atoms such as methyl, ethyl, propyl, isopropyl, butyl, pentyl, hexyl, methoxyethyl, 2-cyanoethyl, benzyl, 2-hydroxyethyl, 2-methanesulfonamidoethyl, etc.; halogen such as chlorine, bromine, or fluorine; —NHCOR$^1$ or —NHSO$_2$R$^1$; and X represents hydrogen or the atoms necessary to complete a 5- or 6-membered, substituted or unsubstituted, carbocyclic or heterocyclic ring system.

In a preferred embodiment of the invention, A and $R^4$ in the above formula for the yellow merocyanine dye are combined together to form the following ring system:

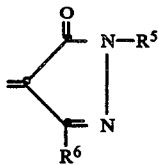

wherein:
$R^5$ is $CH_3$ or $C_6H_5$; $R^6$ is $CH_3$, H or $COOC_2H_5$; and n is 0.

In another preferred embodiment of the invention, A and $R^4$ in the above formula for the yellow merocyanine dye are combined together to form the following ring system:

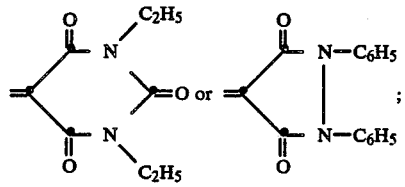

and n is 0.

In yet another preferred embodiment of the invention, A is —CN, n is 0 and $R^4$ is phenyl or an alkyl group of from 1 to about 6 carbon atoms. Further details of the above yellow merocyanine dyes are contained in U.S. application Ser. No. 059,442, referred to above, the disclosure of which is hereby incorporated by reference.

In another preferred embodiment of the invention, the cyan indoaniline dye has the formula:

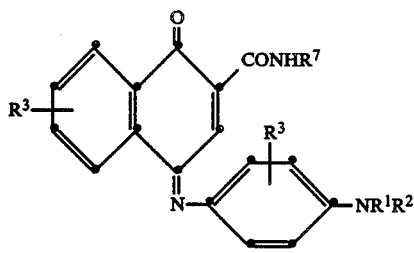

wherein:
$R^7$ is the same as $R^1$ and $R^2$ which are defined as above; and
each $R^3$ is independently hydrogen; a substituted or unsubstituted alkyl group of from 1 to about 6 carbon atoms; halogen; —$NHCOR^1$ or —$NHSO_2R^1$.

In yet another preferred embodiment, $R^7$ in the above formula for the cyan indoaniline dye is methyl. In still yet another preferred embodiment, $R^1$ and $R^2$ are each ethyl. In another preferred embodiment, each $R^3$ is hydrogen or methyl. In still another preferred embodiment, $R^7$ is methyl and $R^1$ and $R^2$ are each ethyl. Further details of the above cyan indoaniline dyes are contained in U.S. application Ser. No. 911,839 of Evans et al filed Sept. 26, 1986, now U.S. Pat. No. 4,695,287, the disclosure of which is hereby incorporated by reference.

Yellow merocyanine compounds included within the scope of the invention include the following:

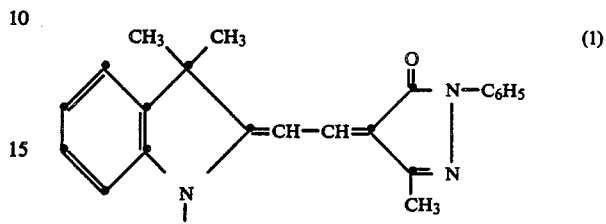

(1)

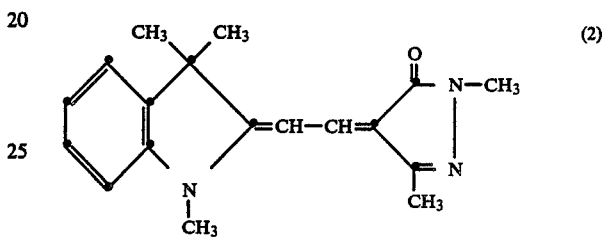

(2)

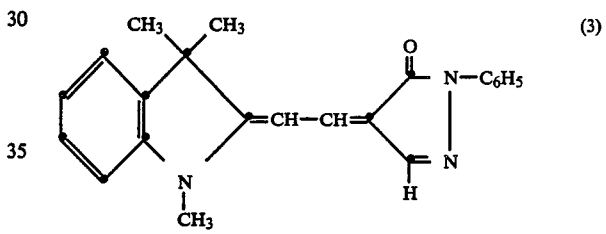

(3)

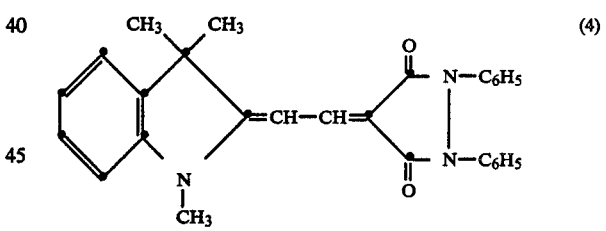

(4)

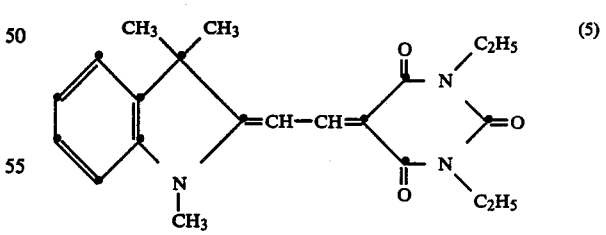

(5)

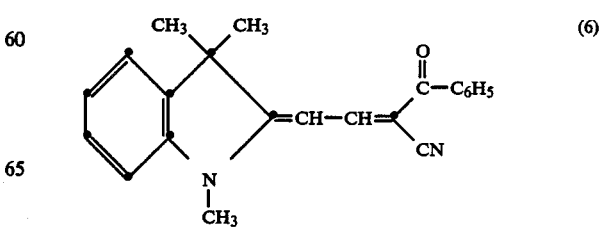

(6)

-continued
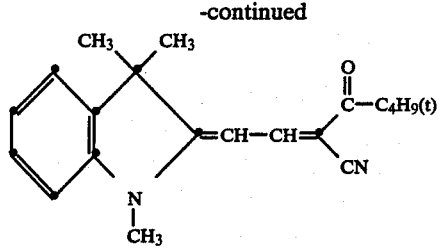 (7)
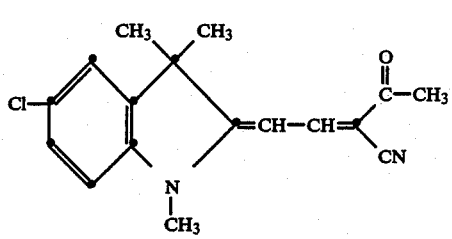 (8)
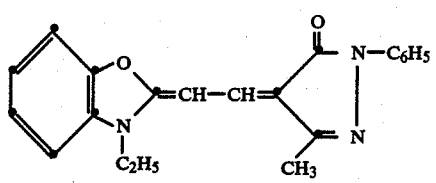 (9)
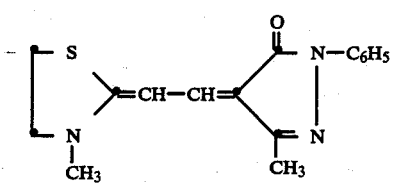 (10)
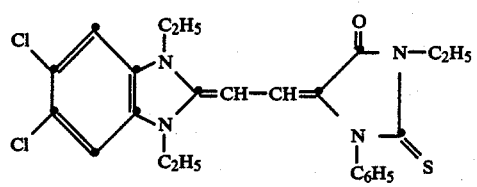 (11)
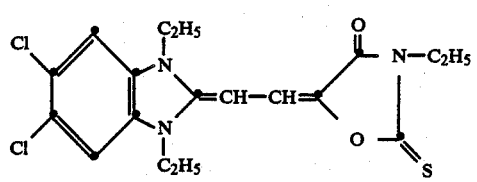 (12)
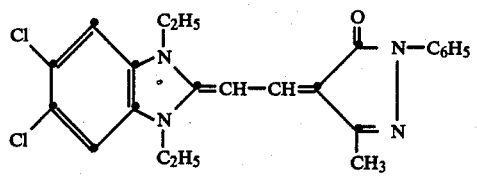 (13)
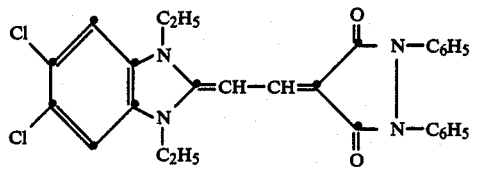 (14)
-continued
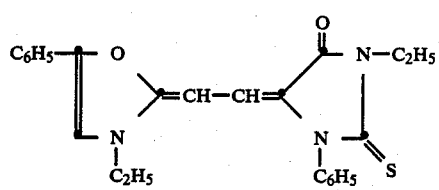 (15)
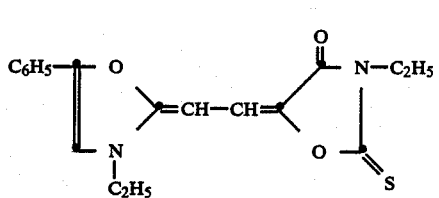 (16)
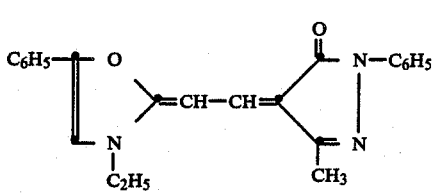 (17)
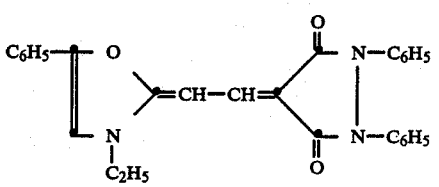 (18)
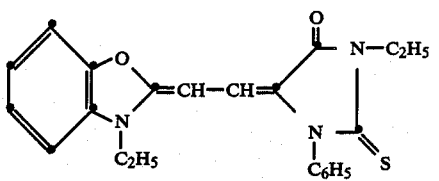 (19)
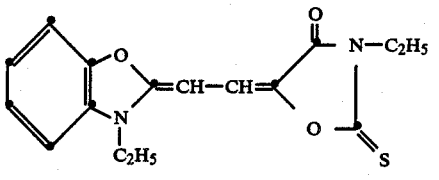 (20)
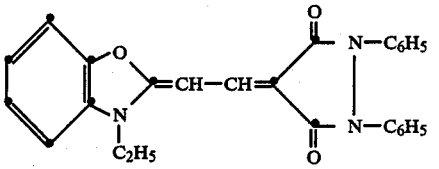 (21)
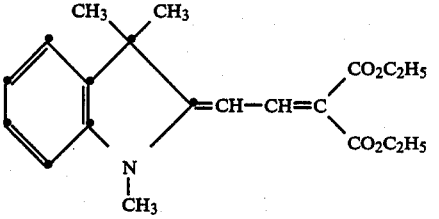 (22)

-continued
(23) 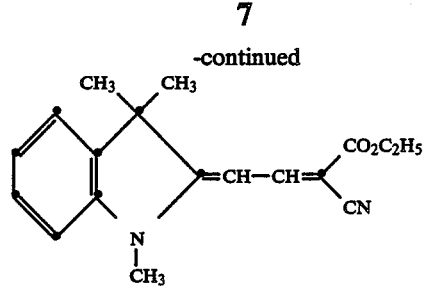
(24) 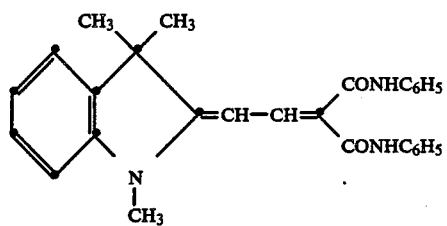
(25) 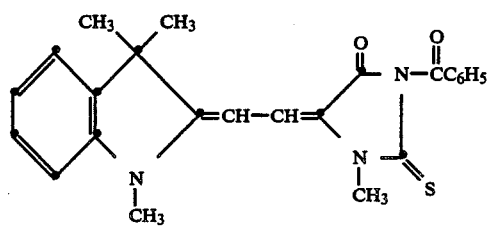
(26) 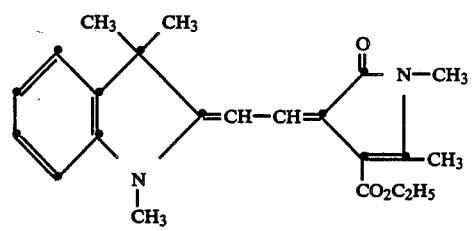
(27) 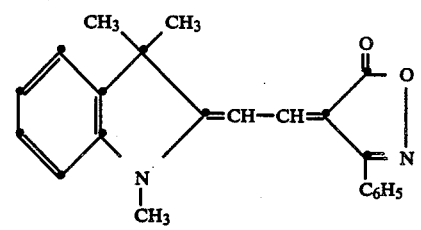
(28) 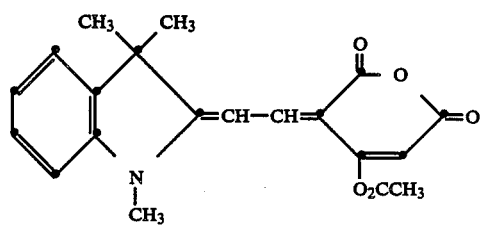
(29) 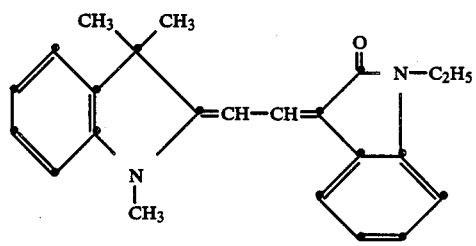
-continued
(30) 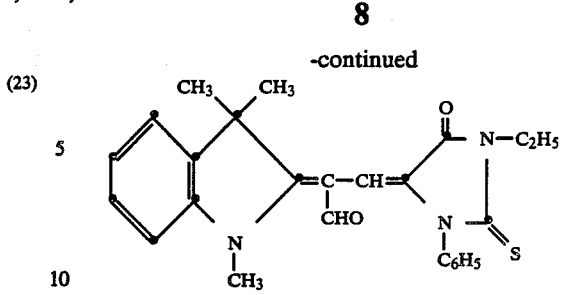
(31) 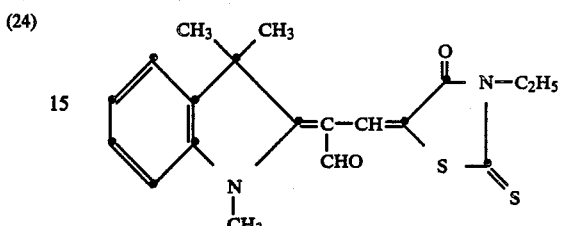
(32) 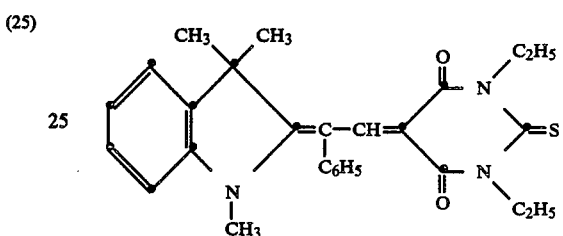
(33) 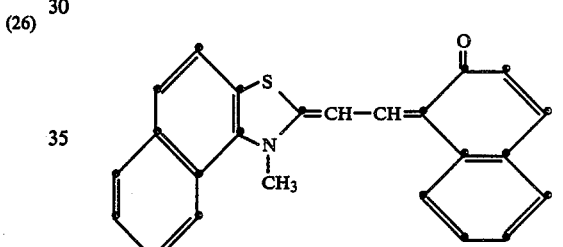
(34) 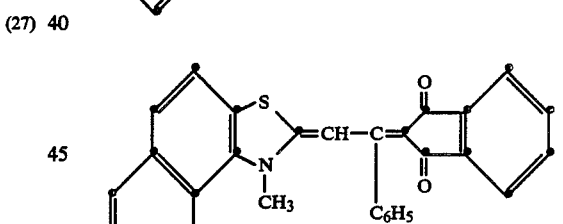
(35) 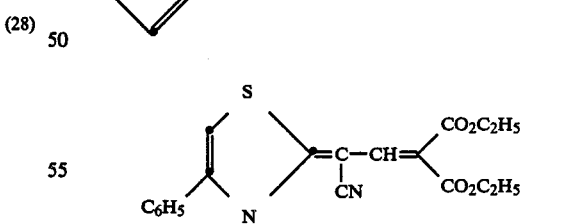
(36) 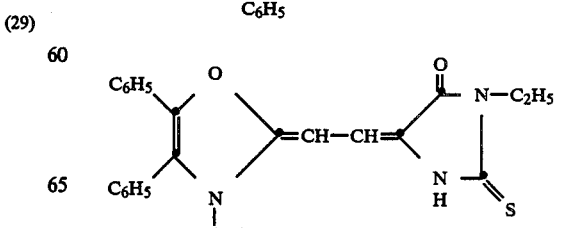

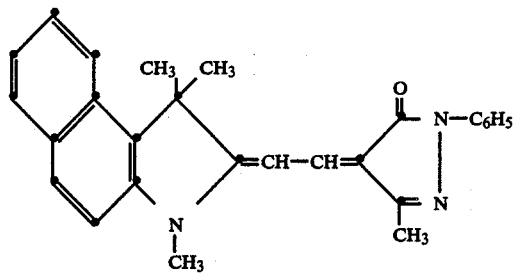 (37)

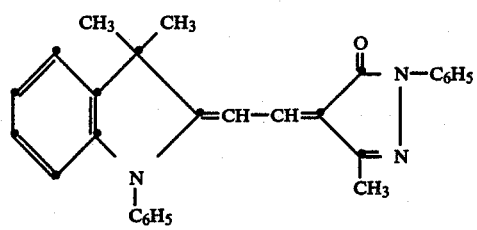 (38)

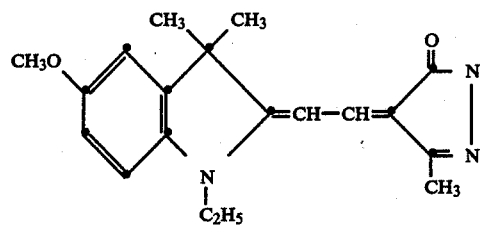 (39)

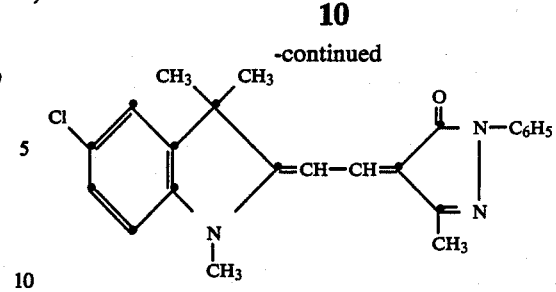 (40)

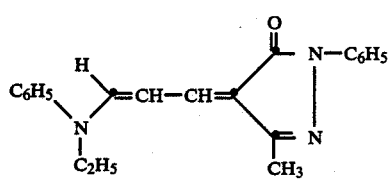 (41)

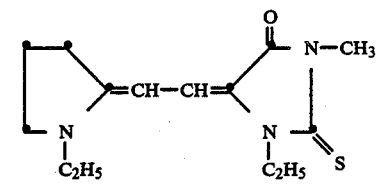 (42)

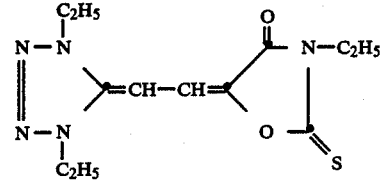 (43)

Cyan indoaniline dyes included within the scope of the invention include the following:

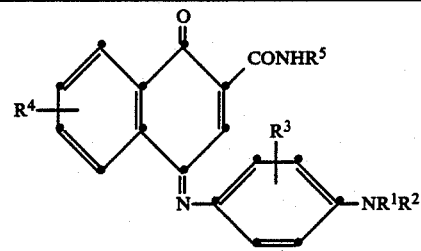

| Compound No. | $R^1$ | $R^2$ | $R^3$ | $R^4$ | $R^5$ |
|---|---|---|---|---|---|
| A | $C_2H_5$ | $C_2H_5$ | H | H | $CH_3$ |
| B | $C_2H_5$ | $C_2H_5$ | 2-$CH_3$ | H | $CH_3$ |
| C | $C_2H_5$ | $C_2H_5$ | 2-$CH_3$ | H | n-$C_4H_9$ |
| D | —$CH_2CH_2NHSO_2CH_3$ | $C_2H_5$ | 2-$CH_3$ | H | —$CH_2C_6H_5$ |
| E | —$CH_2CH_2OCH_3$ | $C_2H_5$ | 2-$CH_3$ | H | $CH_3$ |
| F | $C_2H_5$ | $C_2H_5$ | 2-$CH_3$ | 5-$NHSO_2CH_3$ | $C_2H_5$ |
| G | $CH_3$ | $CH_3$ | H | H | $C_6H_5$ |
| H | —$CH_2CH_2OH$ | $C_2H_5$ | 2-$CH_3$ | H | $CH_3$ |
| I | $C_2H_5$ | $C_2H_5$ | —NHCOCH$_3$ | H | $CH_3$ |
| J | $C_2H_5$ | $C_2H_5$ | H | H | $CH_3$ |
| K | $C_2H_5$ | $C_2H_5$ | H | H | t-$C_4H_9$ |
| L | $C_2H_5$ | $C_2H_5$ | H | H | —$CH_2C_6H_5$ |
| M | $C_2H_5$ | $C_2H_5$ | H | H | —$C_6H_{11}$(ring) |
| N | $C_2H_5$ | $C_2H_5$ | 2-$CH_3$ | 5-$NHSO_2CH_3$ | $CH_3$ |
| O | $C_2H_5$ | $C_2H_5$ | 2-$CH_3$ | H | $C_6H_5$ |
| P | $C_2H_4OH$ | $C_2H_5$ | 2-$CH_3$ | H | $CH_3$ |
| Q | $C_2H_4OH$ | $C_2H_5$ | 2-$CH_3$ | H | $CH_2CH_2OCH_3$ |
| R | $CH_2CH_2NHSO_2CH_3$ | $C_2H_5$ | 2-$CH_3$ | H | $CH_3$ |
| S | $C_2H_5$ | $C_2H_5$ | 2-$CH_2CH_2$—$NHSO_2CH_3$ | H | $CH_3$ |

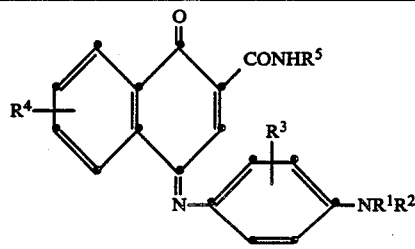

| Compound No. | $R^1$ | $R^2$ | $R^3$ | $R^4$ | $R^5$ |
|---|---|---|---|---|---|

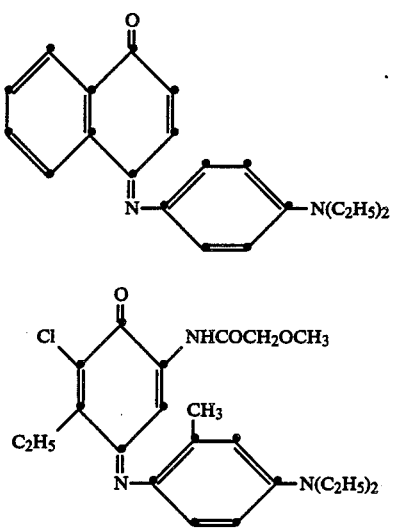

When a magenta dye is also transferred to the thermal print element of the invention described above which contains a merocyanine yellow and a cyan indoaniline dye image, then a good neutral (monochrome) image may be obtained.

A dye-donor element is used to make the thermal print element of the invention and comprises the dyes described above dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m$^2$.

The dye layers of the dye-donor element may be coated on the support or printed thereon by a printing technique such as a gravure process.

Any material can be used as the support for the dye-donor element provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as polyvinylidene fluoride or poly(tetrafluoroethylene-co-hexafluoropropylene); polyethers such as polyoxymethylene; polyacetals; polyolefins such as polystyrene, polyethylene, polypropylene or methylpentane polymers; and polyimides such as polyimide-amides and polyether-imides. The support generally has a thickness of from about 2 to about 30 μm. It may also be coated with a subbing layer, if desired.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semi-crystalline organic solids that melt below 100° C. such as poly(vinyl stearate), beeswax, perfluorinated alkyl ester polyethers, poly(caprolactone), silicone oil, poly(tetrafluoroethylene), carbowax or poly(ethylene glycols). Suitable polymeric binders for the slipping layer include poly(vinyl alcohol-co-butyral), poly(vinyl alcohol-co-acetal) poly(styrene), poly(vinyl acetate), cellulose acetate butyrate, cellulose acetate, or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.1 to 50 weight %, preferably 0.5 to 40, of the polymeric binder employed.

As noted above, the dye-donor elements of the invention are used to form a dye transfer image. Such a process comprises imagewise-heating a dye-donor element as described above and transferring a dye image to a dye-receiving element to form the dye transfer image.

The dye-donor element used to make the thermal print elements of the invention may be used in sheet form or in a continuous roll or ribbon. If a continuous roll or ribbon is employed, it may have only the yellow and cyan dyes thereon as described above or may have alternating areas of other different dyes, such as sublimable magenta and/or black or other dyes.

The support for the thermal print element of the invention may be a transparent film such as a poly(ether sulfone), a polyimide, a cellulose ester such as cellulose acetate, a poly(vinyl alcohol-co-acetal) or a poly(ethylene terephthalate). The support may also be reflective such as baryta-coated paper, polyethylene-coated paper, white polyester (polyester with white pigment incorporated therein), an ivory paper, a condenser paper or a synthetic paper such as duPont Tyvek ®. In a preferred embodiment, polyester with a white pigment incorporated therein is employed.

The layer containing the dye image employed in the invention may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 5 g/m².

In a preferred embodiment, a polycarbonate layer containing the dye image is used which has a number average molecular weight of at least about 25,000. The term "polycarbonate" as used herein means a polyester of carbonic acid and glycol or a divalent phenol. Examples of such glycols or divalent phenols are p-xylene glycol, 2,2-bis(4-oxyphenyl)propane, bis(4-oxyphenyl)methane, 1,1-bis(4-oxyphenyl)ethane, 1,1-bis(oxyphenyl)butane, 1,1-bis(oxyphenyl)cyclohexane, 2,2-bis(oxy phenyl)butane, etc.

In an especially preferred embodiment of the invention, the above-described polycarbonate is a bisphenol A polycarbonate. In another preferred embodiment of the invention, the bisphenol A polycarbonate comprises recurring units having the formula:

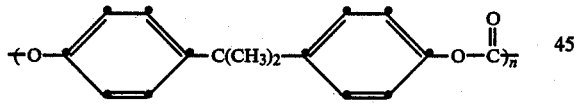

wherein n is from about 100 to about 500.

Examples of such polycarbonates include: General Electric Lexan ® Polycarbonate Resin #ML-4735 (Number average molecular weight app. 36,000), and Bayer AG, Makrolon #5705 ® (Number average molecular weight app. 58,000).

The polycarbonate employed in the layer containing the dye image may be present in any amount which is effective for the intended purpose. In general, good results have been obtained at a total concentration of from about 1 to about 5 g/m².

Thermal printing heads which can be used to transfer dye from the dye-donor elements used to make the thermal print elements of the invention are available commercially. There can be employed, for example, a Fujitsu Thermal Head (FTP-040 MCS001), a TDK Thermal Head F415 HH7-1089 or a Rohm Thermal Head KE 2008-F3.

The following example is provided to illustrate the invention.

EXAMPLE

A yellow dye-donor element was prepared by coating the following layers in the order recited on a 6 μm poly(ethylene terephthalate) support:

(1) Dye-barrier layer of poly(acrylic) acid (0.17 g/m²) coated from water, and (2) Dye layer containing a yellow dye as identified in the following Table (0.27 g/m²), a cellulose acetate binder (40% acetyl) (0.32 g/m²), and FC-431 ® (3M Corp.) surfactant (2.2 mg/m²), coated from a 2-butanone, cyclohexanone, and acetone solvent mixture.

On the back side of the element was coated a slipping layer of the type disclosed in copending U.S. patent application Ser. No. 925,949 of Vanier et al. filed Nov. 3, 1986.

Cyan dye-donor elements were prepared in the same manner as the yellow dye-donor element except that the dye layers contained 0.28 g/m² of each cyan dye as identified in the following Table and 0.36 g/m² of the cellulose acetate binder.

A magenta dye-donor element was prepared in the same manner with 0.17 g/m² of the following magenta dye and 0.26 g/m² of the cellulose acetate binder:

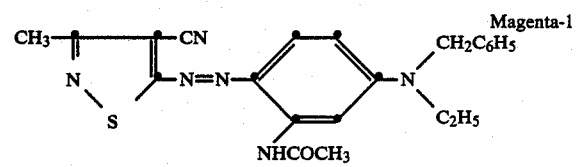

Two comparison dye-donor elements were prepared in the same manner as the magenta dye-donor element except using the following dyes:

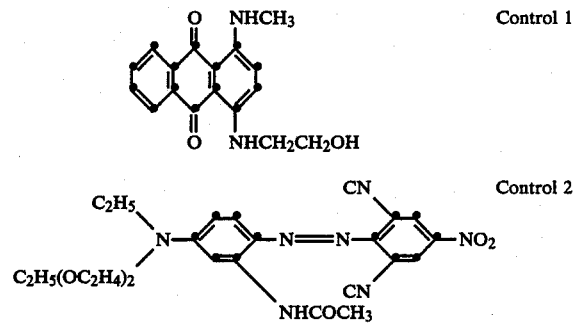

A dye-receiving element was prepared by coating a solution of Makrolon 5705 ® (Bayer AG Corporation) polycarbonate resin (2.9 g/m² in a methylene chloride and trichloroethylene solvent mixture on an ICI Melinex 990 ® white polyester support.

The dye side of the dye-donor element strip one inch (25 mm) wide was placed in contact with the dye image-receiving layer of the dye-receiver element of the same width. The assemblage was fastened in the jaws of a stepper motor driven pulling device. The assemblage was laid on top of a 0.55 (14 mm) diameter rubber roller and a TDK Thermal Head (No. L-133) and was pressed with a spring at a force of 8.0 pounds (3.6 kg) against the dye-donor element side of the assemblage pushing it against the rubber roller.

The imaging electronics were activated causing the pulling device to draw the assemblage between the printing head and roller at 0.123 inches/sec (3.1 mm/sec). Coincidentally, the resistive elements in the thermal print head were pulse-heated at increments from 0 to 8.3 msec to generate a graduated density test pattern. The voltage applied to the print head was approximately 22 v representing approximately 1.5 watts/dot (12 mjoules/dot) for maximum power.

For the control experiments, only the yellow dye was transferred to the receiver. To illustrate the invention, the cyan dye was first transferred to the receiver element and then a second imagewise transfer of the yellow dye was superposed on top of the receiver containing the stepped cyan image. The pulse-heating sequence was adjusted to balance the amount of cyan and yellow dyes transferred to produce green stepped areas of approximately constant ratio of yellow to cyan dye. In one instance, a magenta and cyan dye were both transferred prior to the yellow dye to produce a neutral image and to verify no interaction involving the magenta dye component.

The dye-receiver was separated from each dye-donor and the Status A blue (and red) reflection densities of the stepped image were read. The images were then subjected to HID fading of 7 days, 50 kLux, 5400° K., 32° C., approximately 25% RH, and the percent density loss from D-max and a density of 1.0 were each calculated. The following results were obtained:

TABLE

| Transferred Dyes | | Status A Density | | % Loss (Blue) | |
|---|---|---|---|---|---|
| | | Initial D-max | | From | From |
| Yellow | Cyan | Blue | Red | D-max | D = 1.0 |
| 1 | none (control) | 2.2 | — | 63 | 81 |
| 1 | control 1 | 1.6 | 0.8 | 49 | 55 |
| 1 | control 2 | 1.8 | 1.6 | 82 | 81 |
| 1 | A | 1.7 | 1.5 | 10 | 18 |
| 1 | A* | 2.2 | 2.0 | 16 | 31 |
| 1 | T | 1.7 | 1.2 | 14 | 24 |
| 1 | U | 1.6 | 1.4 | 9 | 15 |
| 2 | none (control) | 1.5 | — | 52 | 60 |
| 2 | A | 1.8 | 1.4 | 18 | 34 |
| 2 | T | 1.2 | 1.2 | 26 | 30 |
| 2 | U | 1.8 | 1.3 | 19 | 30 |
| 3 | none (control) | 1.5 | — | 83 | 92 |
| 3 | A | 1.8 | 1.6 | 24 | 71 |
| 3 | T | 1.8 | 1.3 | 32 | 73 |
| 3 | U | 1.7 | 1.5 | 20 | 59 |

*This sample was a 3-color neutral and consisted of transferred dyes 1 (yellow), A (cyan), and Magenta-1. The Status A green density was initially 2.3.

The results indicate that the cyan indoaniline dyes in accordance with the invention had a very significant effect on the stability to light of the yellow merocyanine dyes, while the comparison cyan dyes had very little effect.

The invention has been described in detail with particular reference to preferred embodiments thereof, but it will be understood that variations and modifications can be effected within the spirit and scope of the invention.

What is claimed is:

1. A thermal print element comprising a support having thereon a layer containing a thermally-transferred dye image, said dye image comprising a yellow merocyanine dye having the formula:

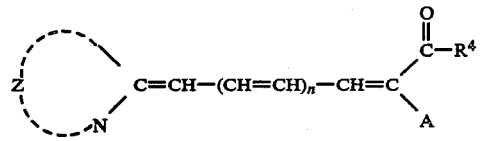

wherein:
A represents —COR, —COOR, —CONHR, —CN, —SO$_2$R or —SO$_2$NR$_2$; or A may be combined together with R$^4$ to form a heterocyclic or carbocyclic ring system;
R$^4$ represents —NHR, —NR$_2$, —OR, —SR, or —R;
n represents 0 or 1;
Z represents the atoms necessary to complete a 5- or 6-membered substituted or unsubstituted heterocyclic ring; and
each R independently represents a substituted or unsubstituted alkyl group of from 1 to about 6 carbon atoms or a substituted or unsubstituted aryl group of from about 6 to about 10 carbon atoms;
said dye image also comprising a cyan indoaniline dye in the same areas as said yellow merocyanine dye to provide improved stability to light for said yellow merocyanine dyes, said cyan indoaniline dye having the formula:

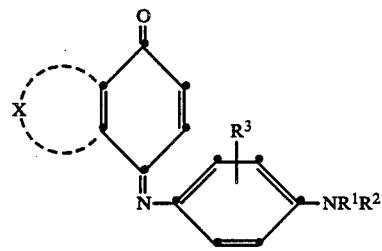

wherein:
R$^1$ and R$^2$ are each independently hydrogen; a substituted or unsubstituted alkyl group of from 1 to about 6 carbon atoms; a substituted or unsubstituted cycloalkyl group of from about 5 to about 7 carbon atoms; or a substituted or unsubstituted aryl group of from about 5 to about 10 carbon atoms;
R$^3$ is hydrogen; a substituted or unsubstituted alkyl group of from 1 to about 6 carbon atoms; halogen; —NHCOR$^1$ or —NHSO$_2$R$^1$; and
X represents hydrogen or the atoms necessary to complete a 5- or 6-membered, substituted or unsubstituted, carbocyclic or heterocyclic ring system.

2. The element of claim 1 wherein A and R$^4$ are combined together to form the following ring system:

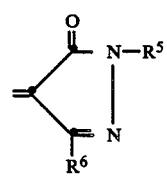

wherein R$^5$ is CH$_3$ or C$_6$H$_5$; R$^6$ is CH$_3$, H or COOC$_2$H$_5$; and n is 0.

3. The element of claim 1 wherein A and R$^4$ are combined together to form the following ring system:

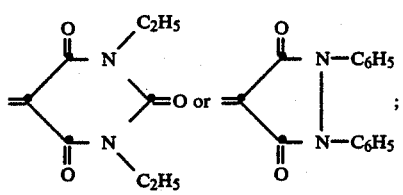

and n is 0.

4. The element of claim 1 wherein A is —CN, n is 0 and $R^4$ is phenyl or an alkyl group of from 1 to about 6 carbon atoms.

5. The element of claim 1 wherein said support comprises poly(ethylene terephthalate) having a white pigment incorporated therein.

6. The element of claim 1 wherein said cyan indoaniline dye has the formula:

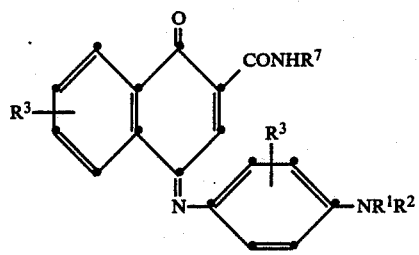

wherein:

$R^1$, $R^2$ and $R^7$ are each independently hydrogen; a substituted or unsubstituted alkyl group of from 1 to about 6 carbon atoms; a substituted or unsubstituted cycloalkyl group of from about 5 to about 7 carbon atoms; or a substituted or unsubstituted aryl group of from about 5 to about 10 carbon atoms; and each $R^3$ is independently hydrogen; a substituted or unsubstituted alkyl group of from 1 to about 6 carbon atoms; halogen; —NHCOR$^1$ or —NHSO$_2$R$^1$.

7. The element of claim 6 wherein $R^7$ is methyl.

8. The element of claim 6 wherein $R^1$ and $R^7$ are each ethyl.

9. The element of claim 6 wherein each $R^3$ is hydrogen or methyl.

10. The element of claim 6 wherein $R^7$ is methyl and $R^1$ and $R^2$ are each ethyl.

11. The element of claim 1 wherein said layer containing said dye image is a polycarbonate having a number average molecular weight of at least about 25,000.

12. The element of claim 11 wherein said polycarbonate is a bisphenol A polycarbonate comprising recurring units having the formula:

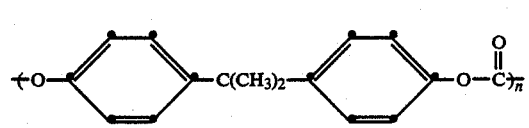

wherein n is from about 100 to about 500.

* * * * *

UNITED STATES PATENT OFFICE
CERTIFICATE OF CORRECTION

PATENT NO. : 4,748,149

DATED : May 31, 1988

INVENTOR(S) : Gary W. Byers

It is certified that error appears in the above-identified patent and that said Letters Patent are hereby corrected as shown below:

Title page, item 63, and column 1, line 8, "4,695,632" should read -- 4,725,574 --.

Title page, line 5 of Abstract; column 1, lines 61-66 and column 16, lines 1-7, the formula should read:

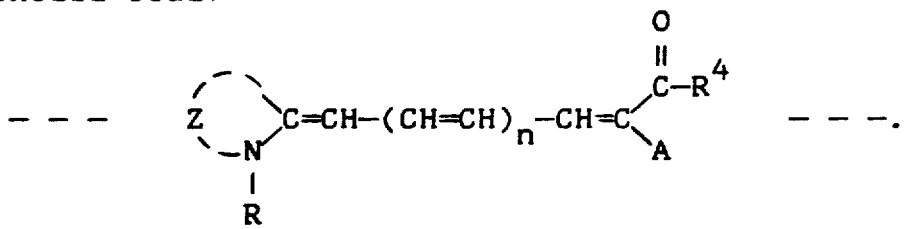

Title page, line 12 of Abstract, "to 1" should read -- or 1 --.

Signed and Sealed this

Fourteenth Day of February, 1989

Attest:

DONALD J. QUIGG

*Attesting Officer*    *Commissioner of Patents and Trademarks*